United States Patent [19]
Brown

[11] Patent Number: 4,814,134
[45] Date of Patent: Mar. 21, 1989

[54] METHOD AND APPARATUS FOR AUTOMATICALLY PACKAGING ARTICLES IN ORDERLY FASHION RECEIVED FROM A MULTI-CAVITY HIGH VOLUME INJECTION MOLDING MACHINE

[75] Inventor: Paul P. Brown, Orangeville, Canada

[73] Assignee: Husky Injection Molding Systems, Ltd., Bolton, Canada

[21] Appl. No.: 47,442

[22] Filed: May 8, 1987

[51] Int. Cl.$^4$ .................. B29C 7/00; B21J 13/08; B65B 35/56
[52] U.S. Cl. .................. 264/297.8; 264/335; 53/446; 53/474; 414/737; 414/752
[58] Field of Search .............. 53/445, 446, 538, 544, 53/238, 143, 244, 247; 425/556, DIG. 201; 264/297.8, 335; 414/751, 752, 736, 737, 225, 730

[56] References Cited
U.S. PATENT DOCUMENTS

| | | | |
|---|---|---|---|
| 3,408,689 | 11/1968 | Heiner | 425/556 |
| 3,802,154 | 4/1974 | Dillon | 53/247 X |
| 3,859,772 | 1/1975 | Thierion | 53/247 X |
| 3,878,665 | 4/1975 | Couten | 53/544 X |
| 3,974,919 | 8/1976 | Bokalders et al. | 53/247 X |
| 4,397,130 | 8/1983 | Thierion | 53/247 X |
| 4,402,173 | 9/1983 | Thierion | 53/247 X |
| 4,571,320 | 2/1986 | Walker | 264/335 X |
| 4,658,626 | 4/1987 | Yamada et al. | 414/752 X |

Primary Examiner—Horace M. Culver
Attorney, Agent, or Firm—Bachman & LaPointe

[57] ABSTRACT

A device is disclosed which operates to receive and package automatically a plurality of articles molded cyclically and continuously by a high speed, high production injection molding machine where the articles are oriented, stacked or nested within a container in an orderly and antiseptic fashion.

14 Claims, 5 Drawing Sheets

METHOD AND APPARATUS FOR AUTOMATICALLY PACKAGING ARTICLES IN ORDERLY FASHION RECEIVED FROM A MULTI-CAVITY HIGH VOLUME INJECTION MOLDING MACHINE

BACKGROUND OF THE INVENTION

This invention relates to injection molding machines and relates, in particular, to methods and an apparatus for retrieving and packaging a plurality of molded articles produced continuously by a multi-cavity mold.

In prior art arrangements high volume molding of relatively small piece parts such as plastic flat ware, table cutlery or similar items are molded in large volumes using injection molding machines having capacity to produce as many as 25,000 piece parts per hour.

In these operations packaging is usually accomplished by sorting, orienting, stacking or nesting the product manually. Alternatively the articles are packaged in bulk in a random and unsorted manner.

While these procedures are useful and operative a considerable amount of labor is necessary if one elects to sort, stack or orient molded parts while keeping abreast of the molding production rate.

In the case of random, unsorted packaging the bulk or volume of the unsorted articles require as much as 30% more packaging material in comparison to packaging required to house the same member of sorted, stacked or oriented articles.

In addition, in cases where it is desirable to package molded articles aseptically in a sorted, stacked or oriented fashion it is very difficult if not impossible to sort manually without breeching the sterile integrity of the product.

BRIEF DESCRIPTION OF THE INVENTION

Consequently, it is a principal object of the present invention to provide a method and an apparatus for packaging the product of a high volume injection molding machine in an orderly fashion automatically.

It is a further feature of the invention to provide a robot device which is operable to receive transport and deposit molded articles in a stacked, oriented or nested fashion thereby requiring a minimum of packaging material and virtually no manual labor.

A further feature of the invention is the provision of a method and apparatus for packaging high volume output of injection molding machines in a sterile condition.

A method of packaging like articles as they are produced in high volume way comprise the steps of molding a predetermined number of articles cyclically in a conventional multi-cavity mold or in a multi-cavity stack mold, arranging the mold cavities so that articles are molded in at least two rows with spaces between each article, providing a receiver having individual article receptors which mate with the mold cavities, transferring molded articles from the mold cavities to their mating receptors, consolidating the rows of articles on said receiver into a single row by moving the articles of one row into the spaces of an adjacent row and thereafter depositing said single row of articles into a container while retaining the orientation of said articles in said single row.

Correspondingly an apparatus for practicing the above method steps may comprise a multi-cavity mold for molding a plurality of rows of articles, a nestable receiving means for receiving and retaining molded articles, motive means for moving said receiving means into register with molded articles retained after molding on said mold cavity, ejector means for transferring said articles for said mold cavity to said receiving means, power means for nesting said receiving means whereby said articles are cast into a single row and transfer means for depositing said single row of articles into a container without altering the disposition of said articles in said single row.

Thus the present invention contemplates the automatic transfer of a plurality of articles from the core side or cavity side of a multi-cavity mold by positively ejecting molded articles individually to fingers of a receiving means where the articles are retained by vacuum or other suitable means in a well known fashion. The receiving means includes at least two relatively movable members or sections each having a plurality of said fingers or receptors in at least two rows where the fingers are spaced and are so arranged that they are operable to register with or align with freshly molded articles. When the fingers are loaded, one member is shifted transversely relative the other member to align or register fingers of said one member with spaces between fingers of the other member. Thereafter, in continuous and automatic sequence, the members are again moved relative to one another to cause the fingers of one member to interdigitate (interleave) with the fingers of the other member. Since each finger is a receptor for an individual molded article transferred from the mold it is apparent that the occurrence of the interdigitating or interleaving action consolidates at least two rows of articles into a single row.

As will be more apparent as this specification proceeds, after the receiving means enters the gap of an open mold to pick up freshly molded product, three basic motions follow sequentially, i.e., a first motion of the receiving means toward the product along a first axis (x axis), a second motion to translate one member of the receiving means relative to the other member along a second axis (z axis) and a third motion to nest (interdigitate) the fingers of both members along a third axis (y axis).

The receiving means or receiver is moved to and fro in timed sequence with the molding cycle. That is, when the mold platens open the receiver moves into the opening into register with the molded articles. The articles are transferred and the receiver moves out of the open mold as the mold platens begins to close for the next sequential molding cycle. As the receiver moves clear of the mold platens the shifting and telescoping action begins to occur. After the receiver is clear of the mold platens and with the molded articles arranged in or converted to a single row, an appropriate mechanism is provided for moving the receiver into register with an open container or a magazine where the vacuum is released and the articles are deposited in the same orientation as developed by the interdigitated fingers.

The container may be moved relative to the receiver, the receiver may be moved relative to the container or both the container and the receiver may be moved to package the articles as considerations, of article conformation and engineering design dictate.

Sensing means are provided so that upon successive deposits of articles into a container, build up of nested or stacked articles is recognized so that each new group is released immediately upon contact with the group previously released or upon contact with the bottom of the container, as the case may be.

It is within the concept of the invention to mold articles of one type (article a) in one row and articles of a different but related type (article b) in another row so that when interdigitating occurs at least two different but related articles will be arranged side by side in an ab, ab, ab sequence to define sets of articles ab. Such sets may then be packaged individually to preserve the composition of each set.

With appropriate mold tooling, sets comprising three or more related articles, such as a knife, fork and spoon (place setting), can be molded in accordance with the principles described above.

While the disclosed embodiment of the invention deals with cutlery, the reference to cutlery is merely explanatory and it is not intended that molded articles be limited to cutlery.

All handling of the molded articles occurs without any manual manipulation so that when molding temperatures are sufficiently high sterile piece parts are produced. Thus, it is possible to package molded articles by means of the present method and apparatus in aseptic fashion.

Other features and advantages of the present invention will become more apparent from an examination of the succeeding specification when read in conjunction with the appended drawings, in which;

DETAILED DESCRIPTION OF THE DRAWINGS

Figure 1:
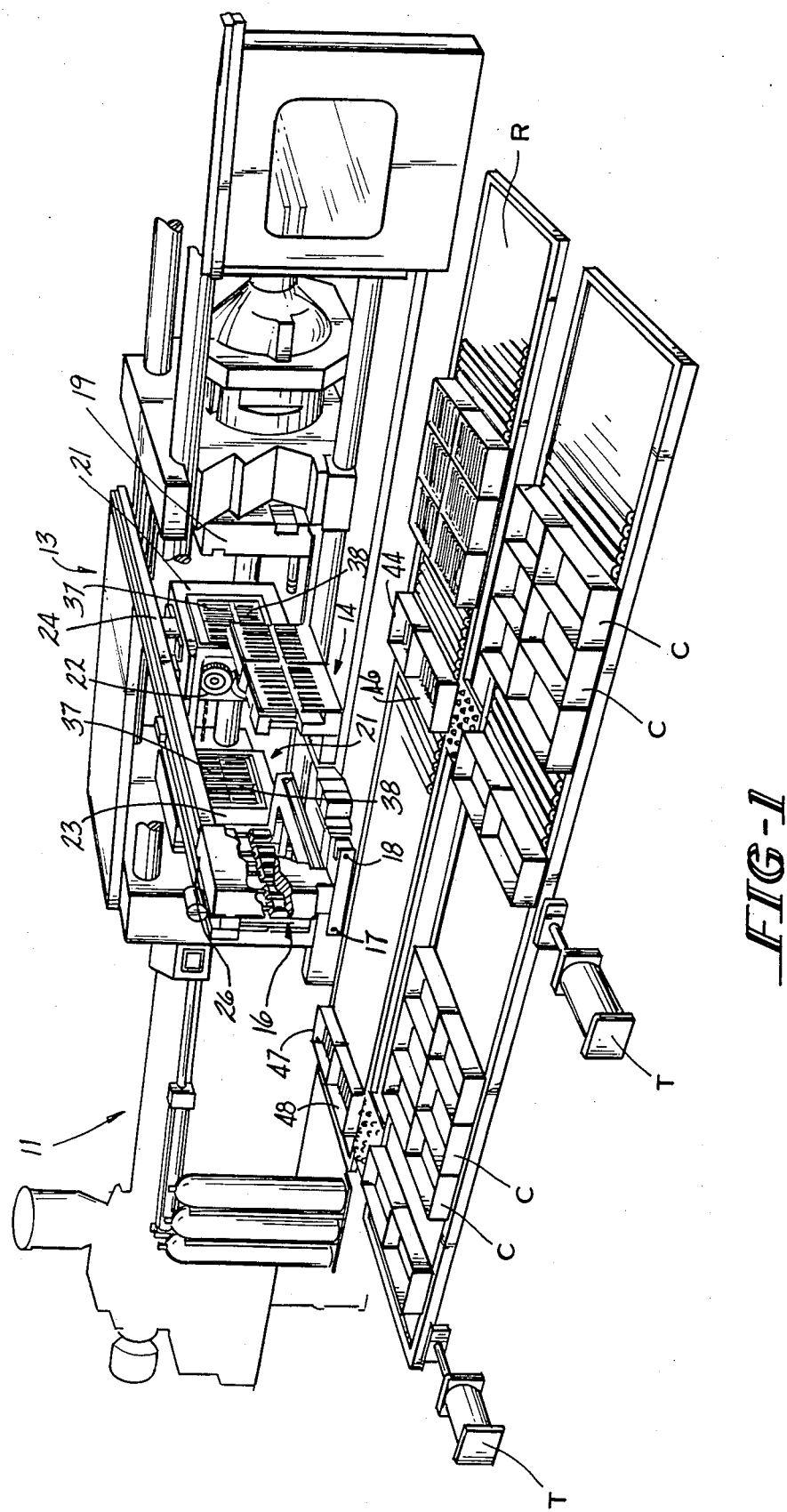
FIG. 1 is a perspective view of an apparatus for automatically packaging molded articles in neatly stacked, nested or uniformly oriented fashion.
Figure 2:
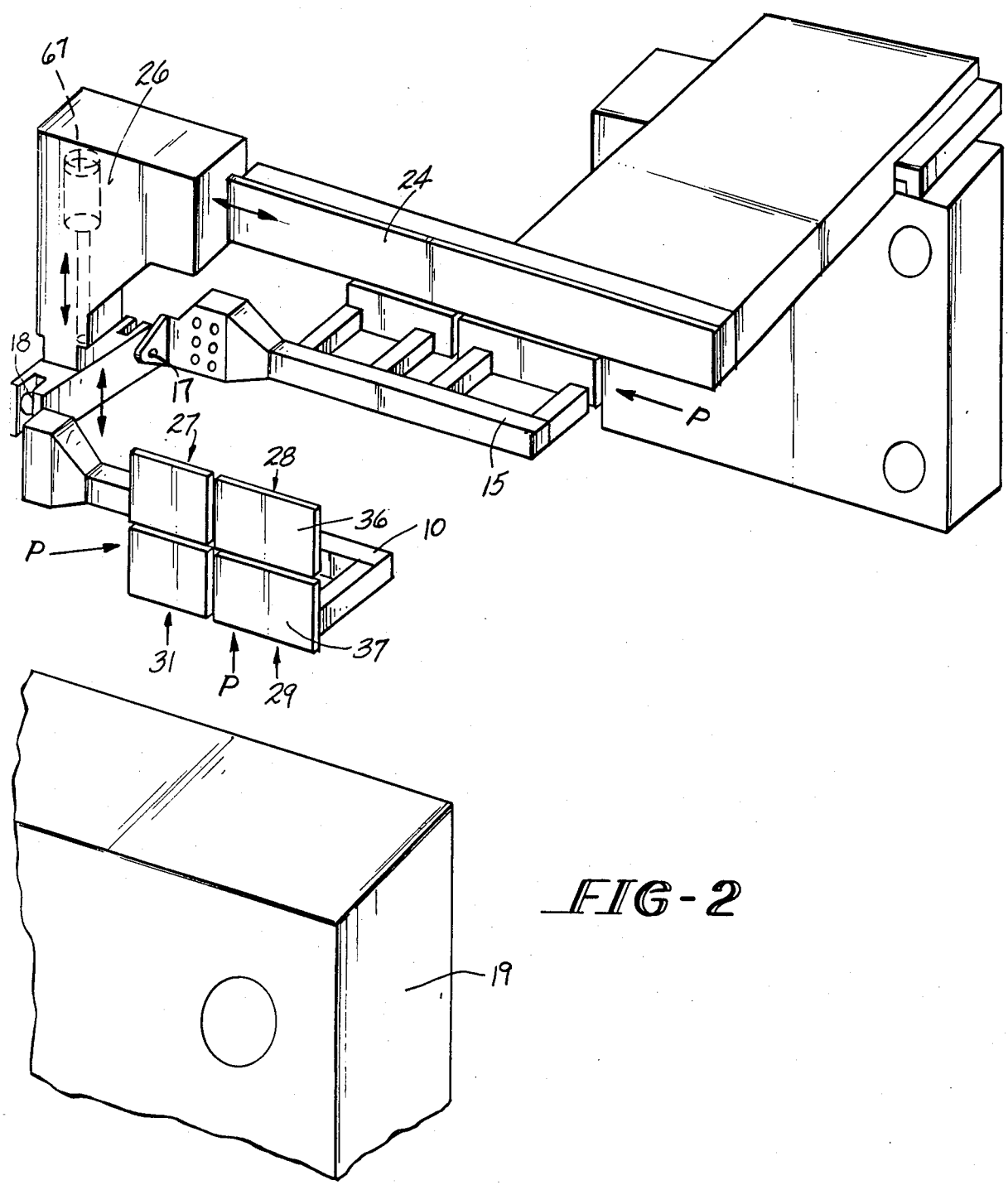
FIG. 2 is a view of a portion of the illustration of FIG. 1, enlarged for clarity.
Figure 3:
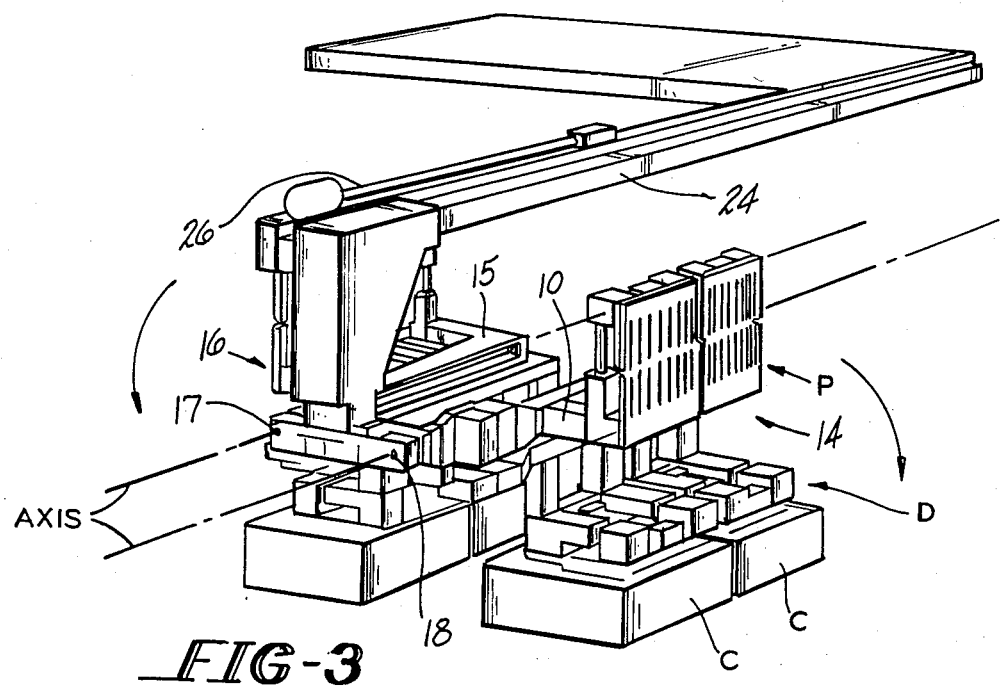
FIG. 3 is a further enlargement of FIG. 2 showing the structure of the tooling heads or article receiving means.

Referring to the drawings, in particular FIGS. 1 and 2, the reference numeral 11 designates an injection molding machine having a stack mold with twin, multiple cavity molds 13 for molding, at high speed, a large number of articles per cycle. Typical articles molded are plastic flat wear or cutlery such as spoons, knives and forks. While the invention will be described in connection with the molding and packaging of plastic spoons it is not intended that the invention be so limited. Obviously any plastic article produced in high volume for medical veterinary, industrial or domestic use will respond to the principles of the method and apparatus of the present invention.

Twin receiving heads or receiving means 14 and 16, supported by shafts 17 and 18 connected to arms 10 and 15 respectively, are rotatable in timed sequence from the "pick up" position P (FIG. 2) to the discharge position D.

The receiving means 14 and 16 are driven to and fro, into and out of the space between open mold platens 19, 21, 22 and 23 along track 24 by motive means 26. The motion of the receiving means into and out of the open mold platens is timed and synchronized with the molding cycle of the mold platens.

Since the receiving means 14 and 16 are identical, a detailed description of receiving means 14 only will be provided.

Each of the receiving means 14-16 disclosed is divided into four members or sections 27, 28, 29, and 31 and each section is formed with tines, tongues or fingers 32, 33, 34 and 36 and each finger operates as a receptor for an individual molded article S which, in the disclosed embodiment of the invention, is a piece of plastic flat ware in the form of a spoon.

Obviously the receiving means 14-16 can be formed with more or less sections as article size and shape and other design considerations dictate. Furthermore, the molded spoon S is disclosed merely by way of describing the invention and it is not intended that the invention be limited to molding and packaging spoons As the mold platens open, the molded articles are retained on the respective platens 19 and 23.

Figure 7:
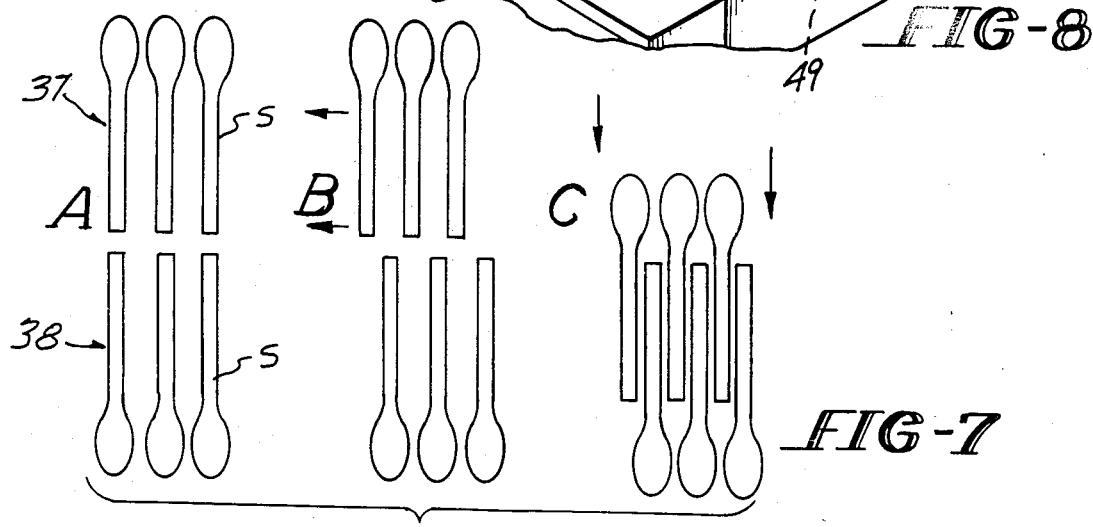
FIG. 7 shows, schematically, the sequencing of the article receiving means i.e., (a) the pick up position, (b) translation of the top portion of the receiving means along z axis and (c) nesting of the receiving means along y axis.

The mold cavities, in the disclosed embodiment, are arranged in two rows 37 and 38 (FIG. 1) and are in registration vertically so that molded articles, such as the spoons S, will bear the relationship as shown schematically at A in FIG. 7.

Entry of the receiving means into the gap of an open mold along track 24 is controlled so that the four sections 27, 28, 29 and 31 thereof are stopped in face to face registration with but spaced from freshly molded articles.

At this time double acting pistons 49 and 51 (FIGS. 8 and 9) operated in timed sequence to move each receiving means 14 and 16 toward the molded articles (along the said x axis) until the sections, such as sections 27, 28, 29 and 31 of receiving means 14, "kiss" the freshly molded articles lightly.

By use of well known ejector pins (not shown) each spoon S is pushed by its individual ejector pin from its mold cavity into contact with the receiving means where the individual spoons are retained by vacuum or other suitable mechanical or magnetic holding means upon mating fingers or spoon receptors.

After the product is loaded on the fingers of the receiving means 14, the double acting pistons 49 and 51 operate to retract the receiving means along the x axis to the original starting position.

Next the motive means 26 operates to move the twin receiving means out of the space between mold platens and the next molding cycle begins.

As the receiving means is withdrawn from the open mold, a second set of double acting pistons 52 and 53 (FIGS. 4, 8 and 9) are activated in timed sequence to develop said second and third motions along said z and y axes, respectively.

Figure 9:
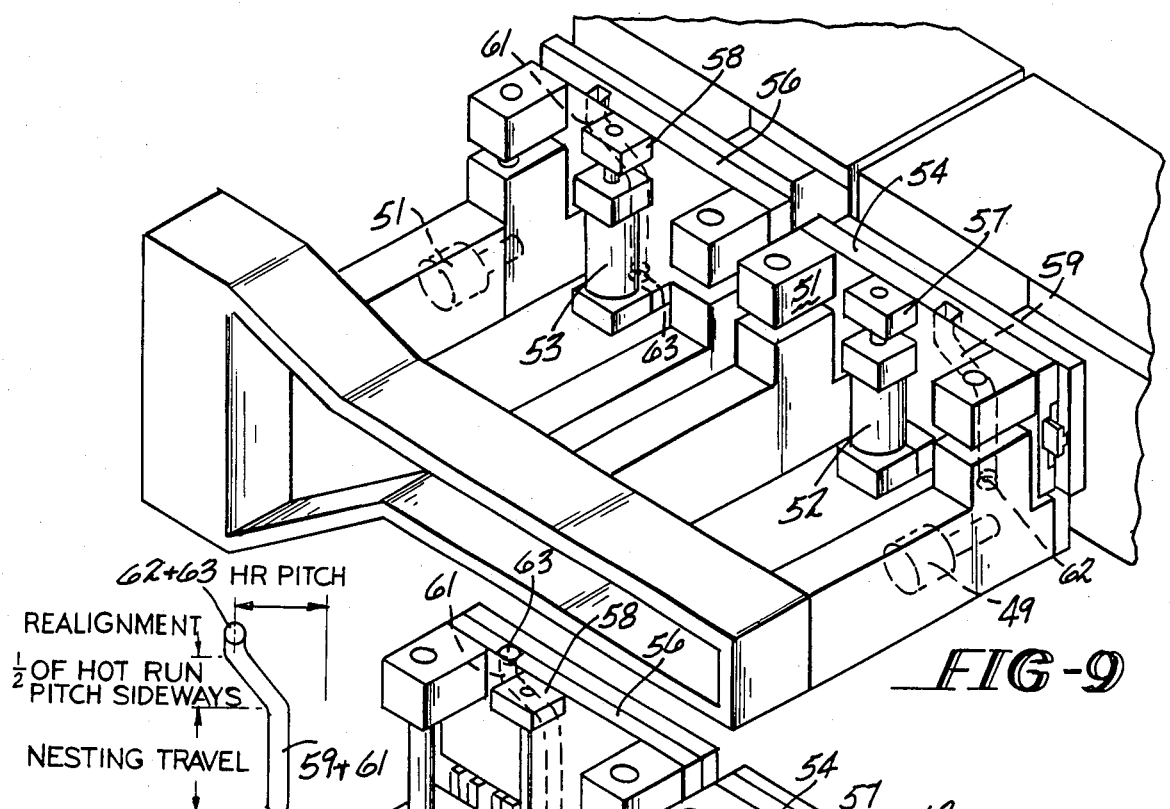
FIG. 8 and 9 show details enlarged of the rear side of the receiving means in the pick up position and in the nested position, respectively.
Figure 8:
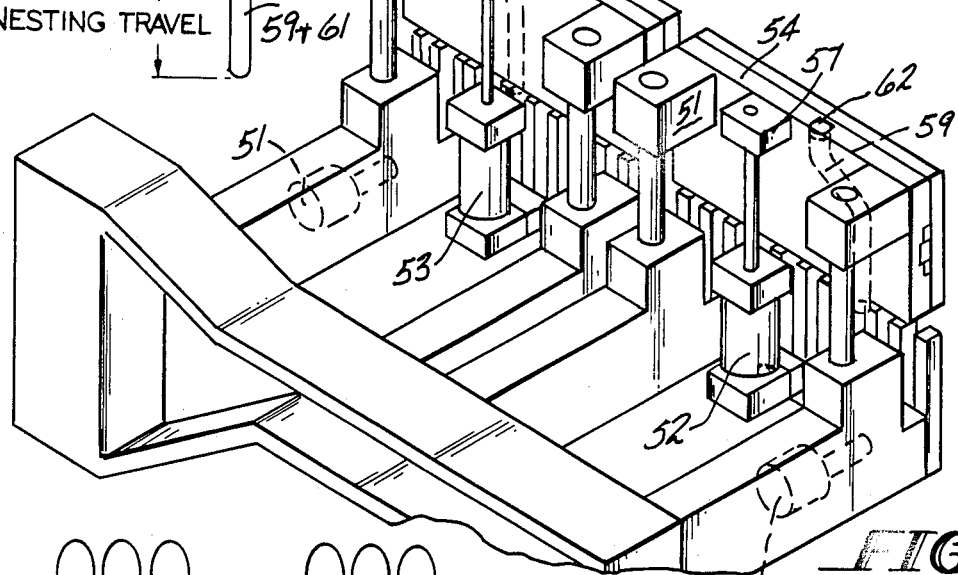

The pistons 52 and 53, connected to plates 54 and 56 via blocks 57 and 58, respectively, operate to move the plates in reciprocatory fashion from the position of FIG. 8 to the position of FIG. 9 (along said y axis).

The plates are formed with cam tracks 59 and 61 which engage followers 62 and 63 fixed to upper receiving members or sections 27 and 28. The sections 27 and 28 are keyed to plates 54 and 56 by T shaped keys 64—64 (only one shown) engaging mating T slots 66—66 permitting relative motion between upper sections 27 and 28 and lower sections 29 and 31 of receiving means 14.

Thus, when double acting pistons operate to move plates 54 and 56 from the position of FIG. 8 to the position of FIG. 9 two motions develop. First, upper sections 27 and 28 respond to camming action to move transversely (along said z axis) to translate said fingers 32 and 33 from the spoon pick up position A of FIGS. 4, 7 and 8 to the shifted position shown in Figs. 4 and 7.

That is, the fingers 32 and 33 of sections 27 and 28 are shifted laterally one half (hot runner) pitch so that they are now poised to enter (interleave with) the spaces between the fingers 34 and 36 of lower fixed sections 29 and 31. See sketch of cam track and follower in FIG. 8.

Figure 4:
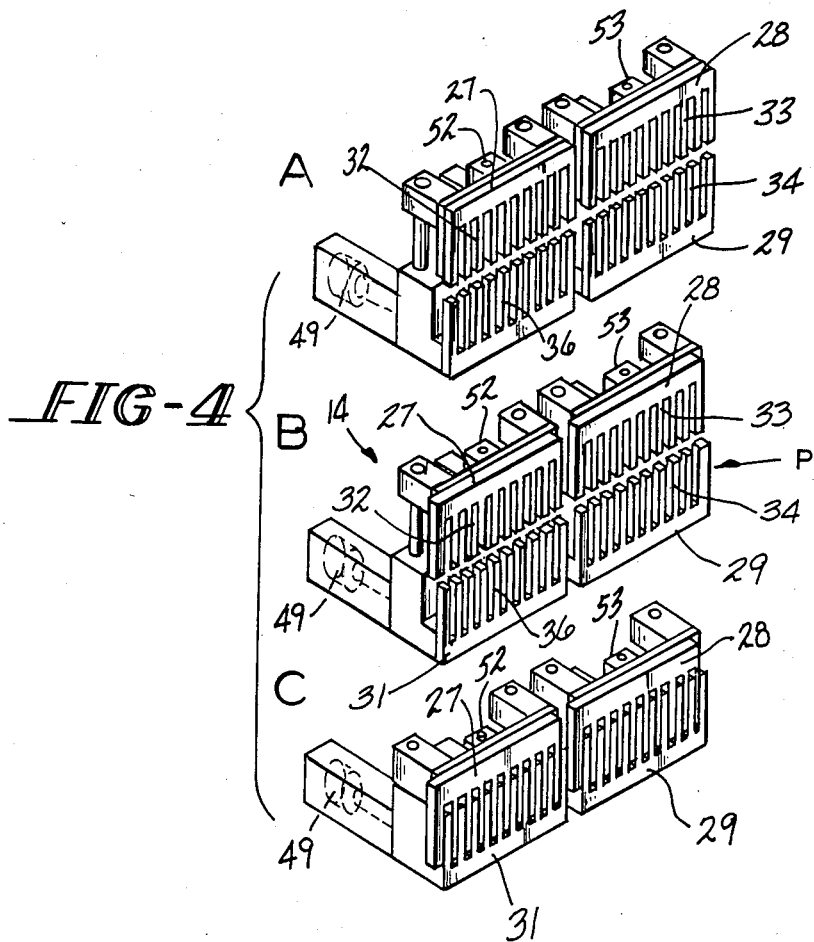
FIG. 4 is a perspective view of the article receiving means in the (a) article "pick up" position, (b) translated position, (c) nested or telescoped position.
Figure 5:
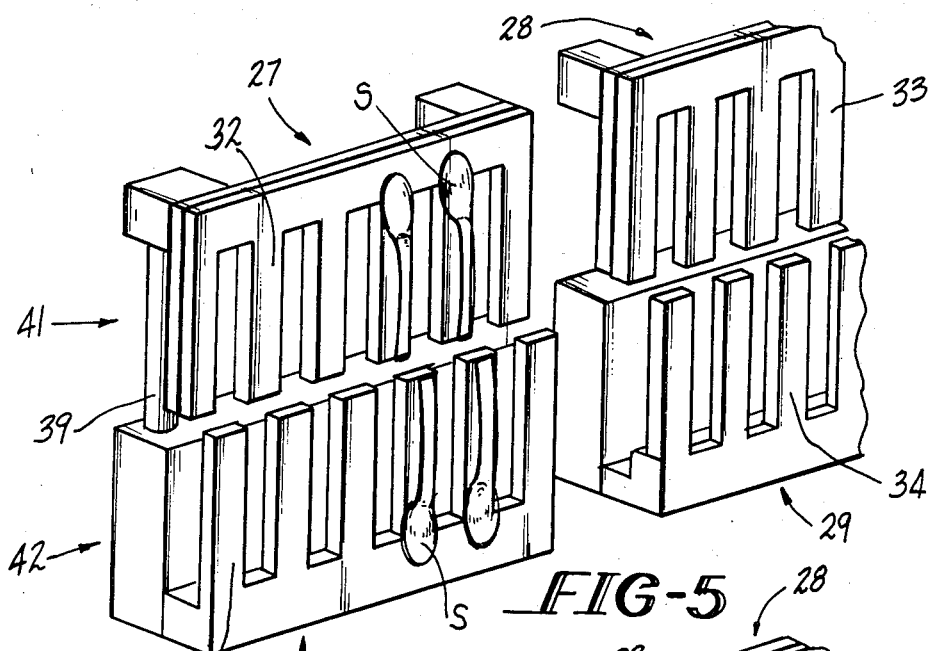
FIGS. 5 and 6 are enlarged views of portions of the (b) and (c) positions of FIG. 4, respectively.
Figure 6:
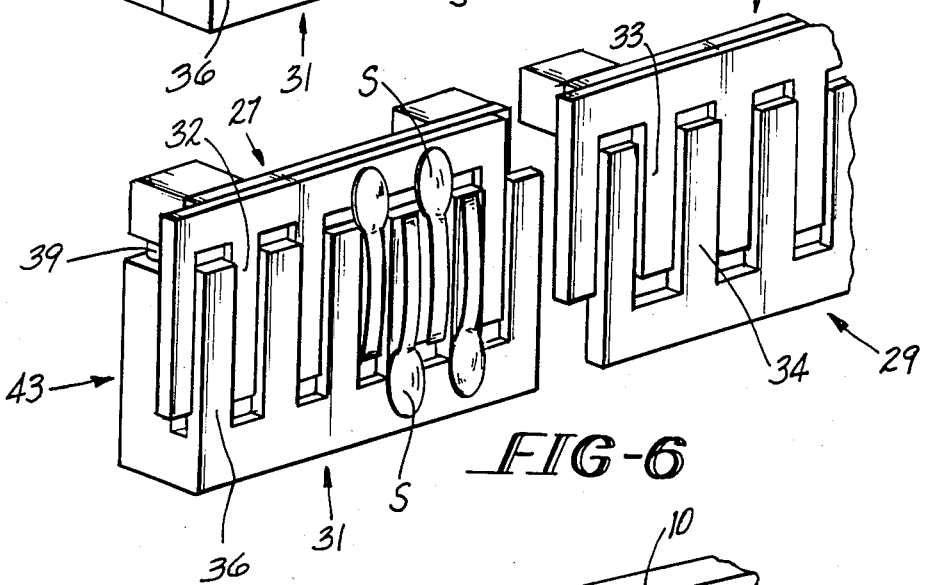

The continued stroke of the pistons 52 and 53 operates to interdigitate the fingers of the receiving means 14 with the result that the spoons S begin moving from the two row condition of position B to the position C of FIGS. 4 and 7. Note that position C in FIG. 7 represents a partially completed stroke. Finally, at the end of the stroke, the spoons are consolidated into a single row as shown in FIGS. 4 and 6.

After the receiving means 14 and 16 reach the end of the withdrawing stroke they are poised above containers C and the fingers are interleaved and the spoons S are thereby "nested".

That is receiving means 14 is above containers 44 and 46 (FIGS. 1 and 10) and receiving means 16 is above containers 47 and 48 (FIG. 1).

Figure 10:
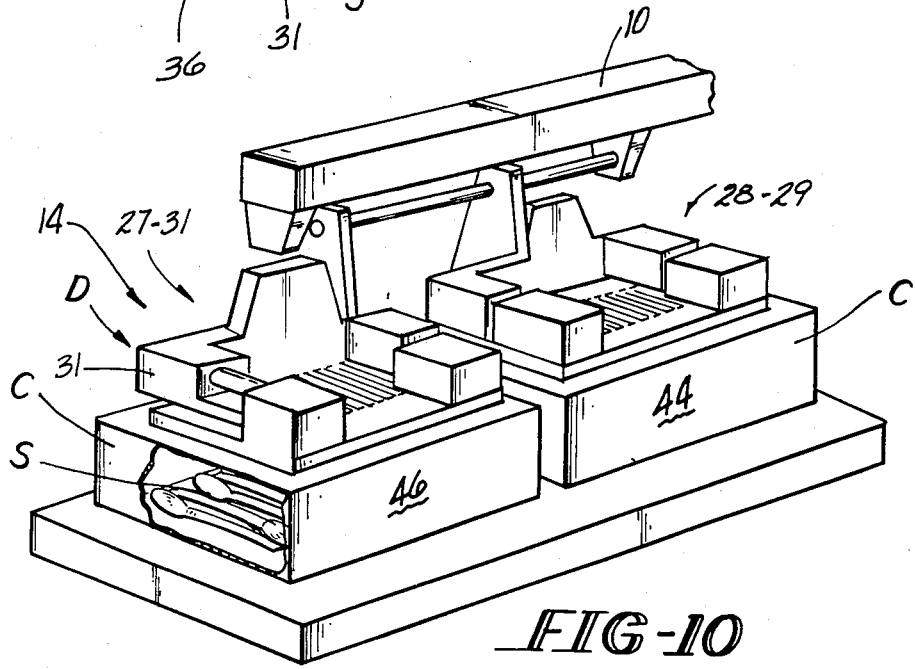
FIG. 10 shows the article receiving means poised for depositing articles in a shipping container.

In timed sequence the receiving means 14 and 16 are rotated about their respective shafts 18 and 19 (receiving means 14 clockwise and receiving means 16 counterclockwise as viewed in FIGS. 1 and 2) from the pick-up position P (FIG. 4) to the nested discharge position D as shown in FIG. 10.

Thereafter the container is raised by known means or the receiving means is lowered until the spoons S contact the bottom (of an empty container) or the top layer of spoons of a partially filled container. Whereupon a sensing means (not shown) reading "contact" operates to break the vacuum or other holding means and the spoons are released gently and in orderly, oriented, stacked fashion into the container.

In the disclosed embodiment the double acting pistons 67 operates to lower the product into the containers. In some cases the containers may take the form of magazines or like units for feeding molded product to a subsequent packaging station.

This packaging process occurs repeatedly until containers are filled. Filled containers are advanced by conveyor R to a further station and new empty containers are moved into position automatically by pistons T (FIG. 1).

It is to be understood that the invention is not limited to the article illustrations described and shown herein, which are deemed to be merely illustrative of the best modes of carrying out the invention, and which are susceptible of modification of form, size, arrangement of parts and details or steps of operation. The invention rather is intended to encompass all such modifications which are within its spirit and scope as defined by the claims.

What is claimed is:

1. A method of receiving molded product from a multi-cavity injection molding machine comprising the steps of:
   introducing a product receiving means into an open mold opposite at least two rows of product, moving the receiving means into a product pick up position along a first axis;
   shifting one row of product relative to another row of product along a second axis; and
   consolidating said product into a single row by moving one row of product relative to the other row along third axis.

2. The method of claim 1 where the molded product of one row is different from the product of the other row whereby said single row develops sets of said different products.

3. The method of claim 2 where the product of one row includes at least two different but related articles in an orderly array and the product of the other row includes a third different but related article whereby said single row of consolidated articles develops sets of at least three different articles.

4. A receiving device for accepting freshly molded articles from a multi-cavity injection molding machine comprising:
   at least two relatively movable members;
   means for moving said receiving device into the gap of an open mold;
   means for moving said receiving device into contact with said articles along a first axis;
   means for transferring said articles from said mold to said receiving device means for retaining said articles on said receiving device;
   means for moving one member relative to the other member along a second axis so that the articles retained on one member are offset relative to articles retained on the other member; and
   means for moving said one member relative to the other member along a third axis whereby the articles of both members are intermingled.

5. The device of claim 4 in which each member includes a plurality of spaced fingers and each finger serves as a receptor for an individual article.

6. The device of claim 4 in which the fingers of one member are opposite the fingers of the other member during motion along said first axis and the fingers of one member are opposite the spaces between fingers of the other member following motion along said second axis.

7. In a multi-cavity molding machine having mold cavities arranged in at least two rows including receiving means divided into at least two relatively movable sections, each said section having a plurality of individual, spaced article receptors arranged to register individually with a mating article, the article receptors of one section being offset relative to the receptors of the other section, a method of handling molded articles comprising the steps of:
   registering each section individually with a row of articles,
   transferring molded articles from the mold to the receptors of said receiving means while maintaining said two row configuration, and
   converting the transferred articles from a two row configuration to a one row configuration while said articles are retained on said receiving means.

8. The method of claim 7 plus the step of retaining the product on said article receptors releasably.

9. The method of claim 8 plus the step of rotating said interleaved sections as a unit from a first plane to a second plane.

10. The method of claim 9 plus the step of registering the rotated unit with an open container and releasing the product from said article receptors into said container while retaining the interleaved configuration of said product.

11. The method of claim 10 plus the step of depositing molded product continuously and in cyclic fashion until said container is filled with stacked, nested and neatly oriented product.

12. The method of claim 10 plus the step of delaying the releasing step until the product makes initial contact with the bottom of the container or with the top layer of product of a partially filled container.

13. The method of claim 7 plus the step of providing individual transfer or ejector pins for each molded product whereby the product is transferred positively and collectively.

14. The method of claim 7 in which the converting step is accomplished by interleaving the article receptors of one section with the article receptors of the other section while the articles are retained on said receiving means.

* * * * *